Jan. 7, 1969     W. D. CORLETT     3,420,272
MIXING VALVE
Filed Dec. 5, 1966     Sheet 1 of 7
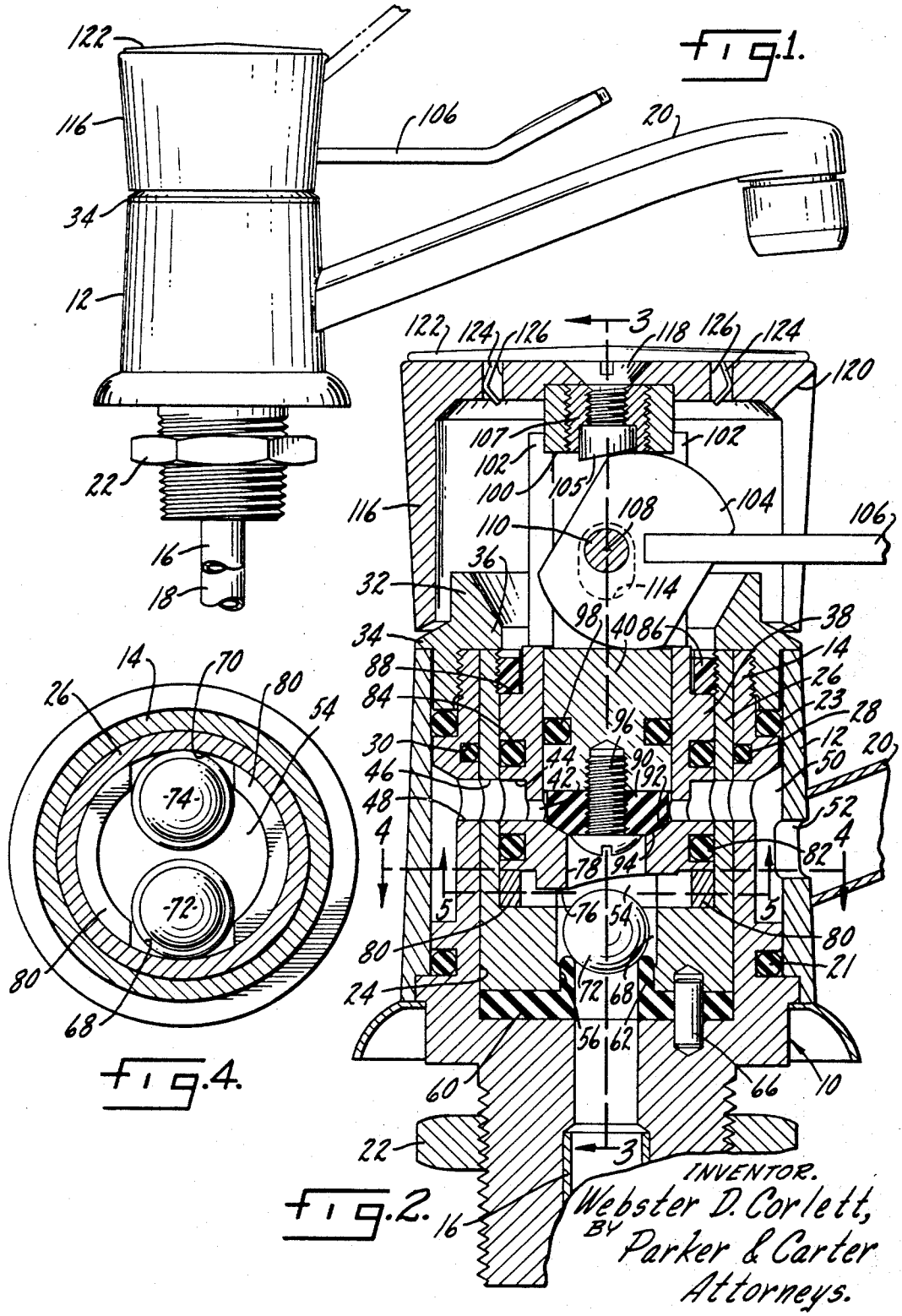

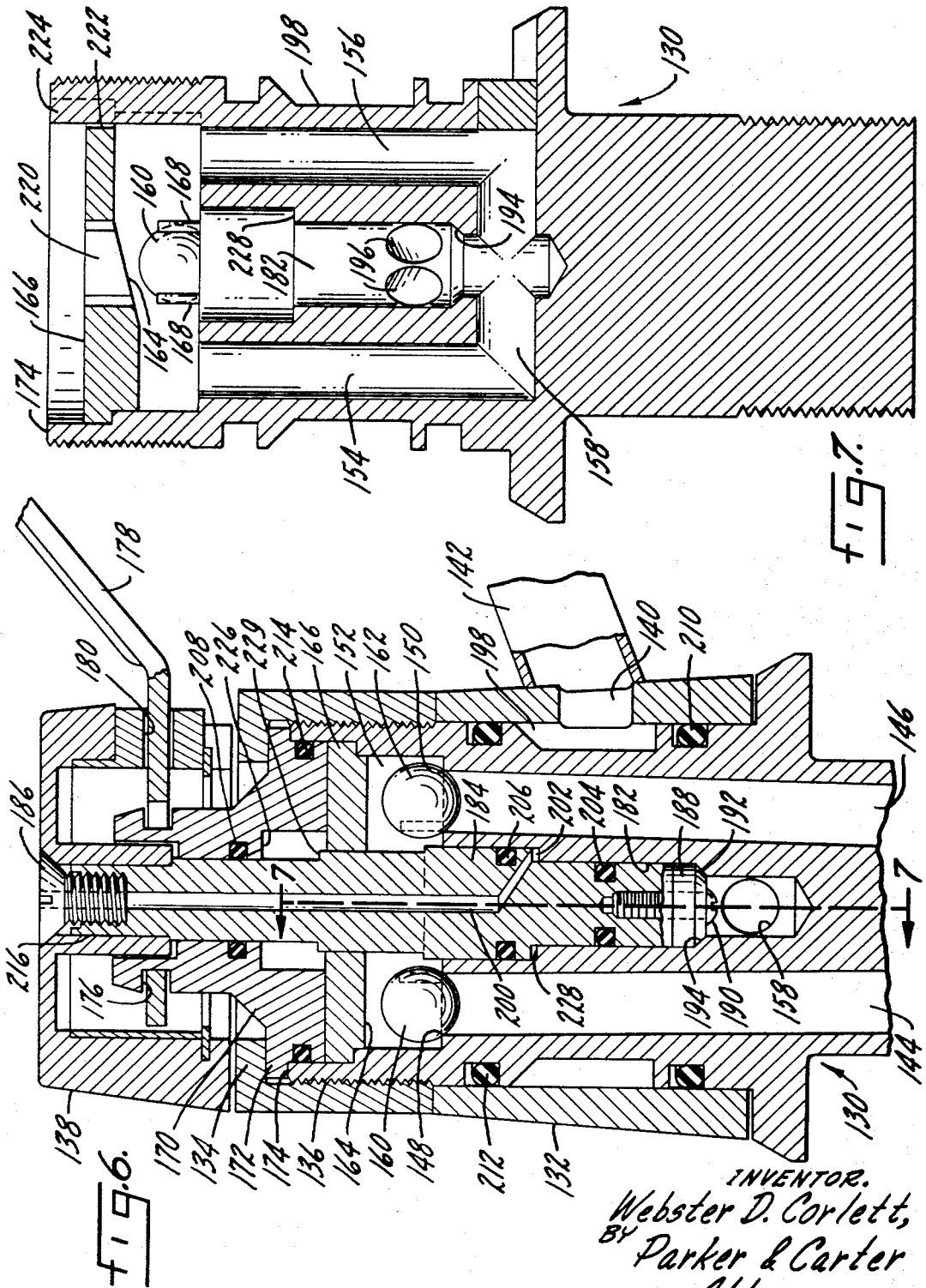

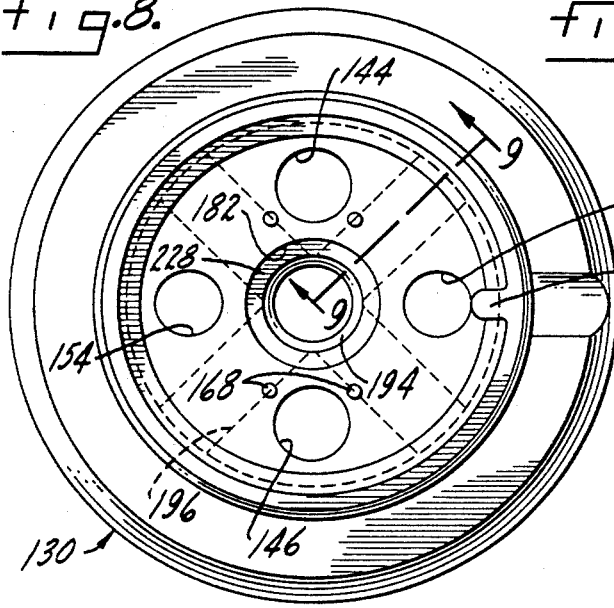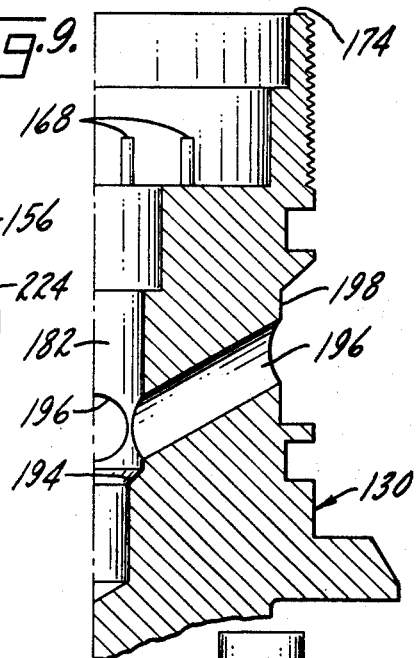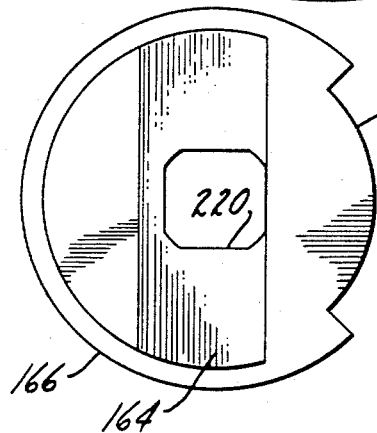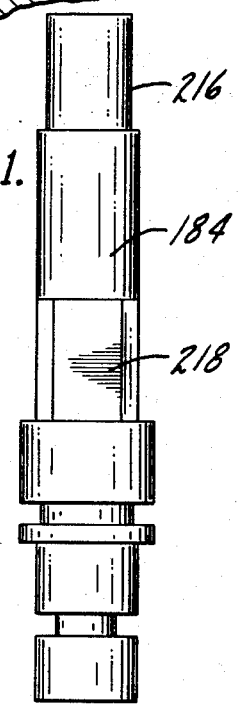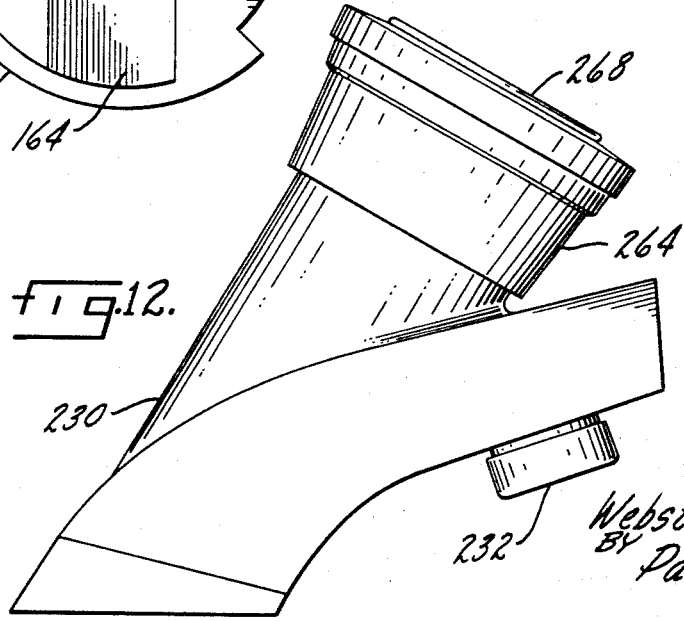

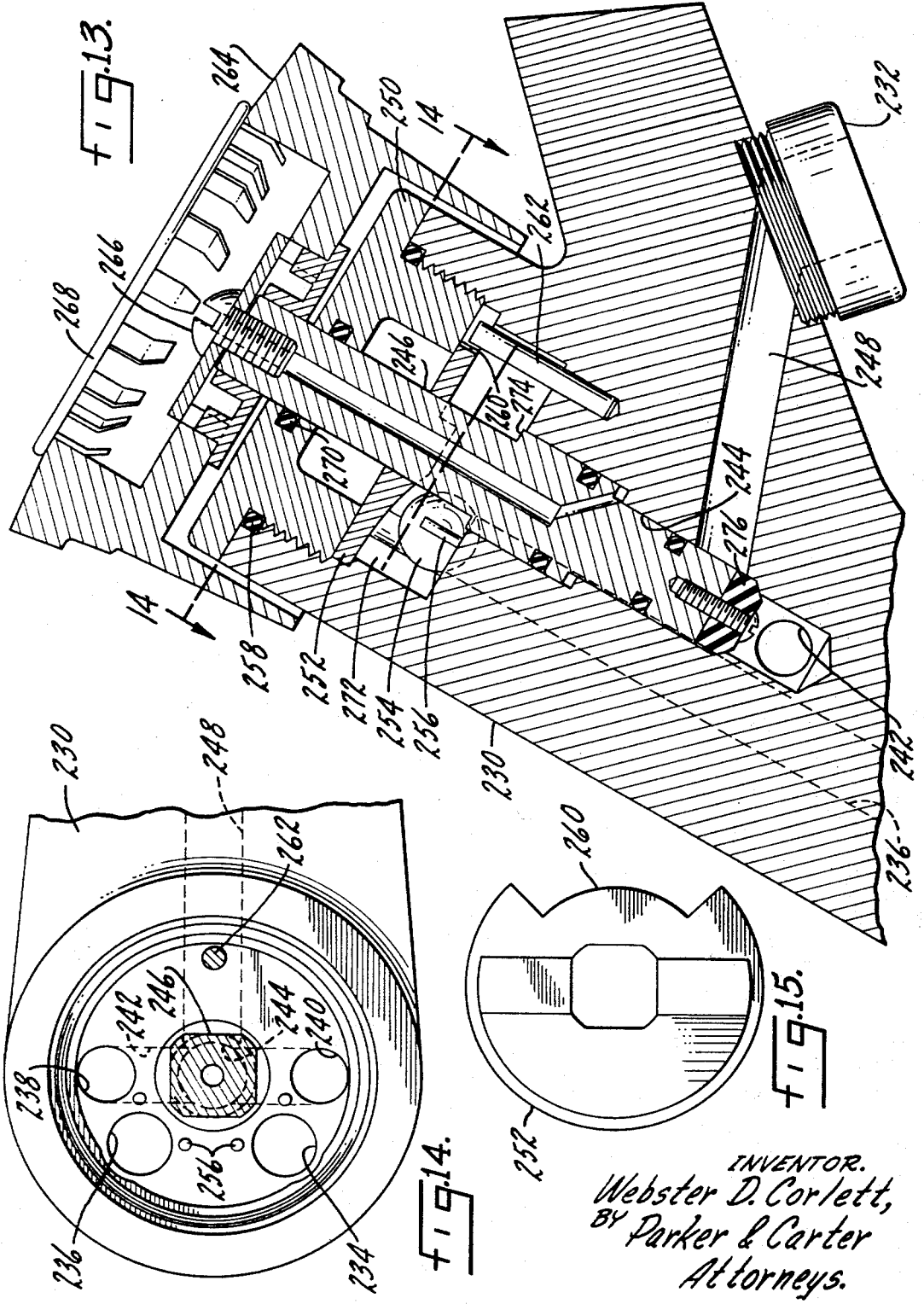

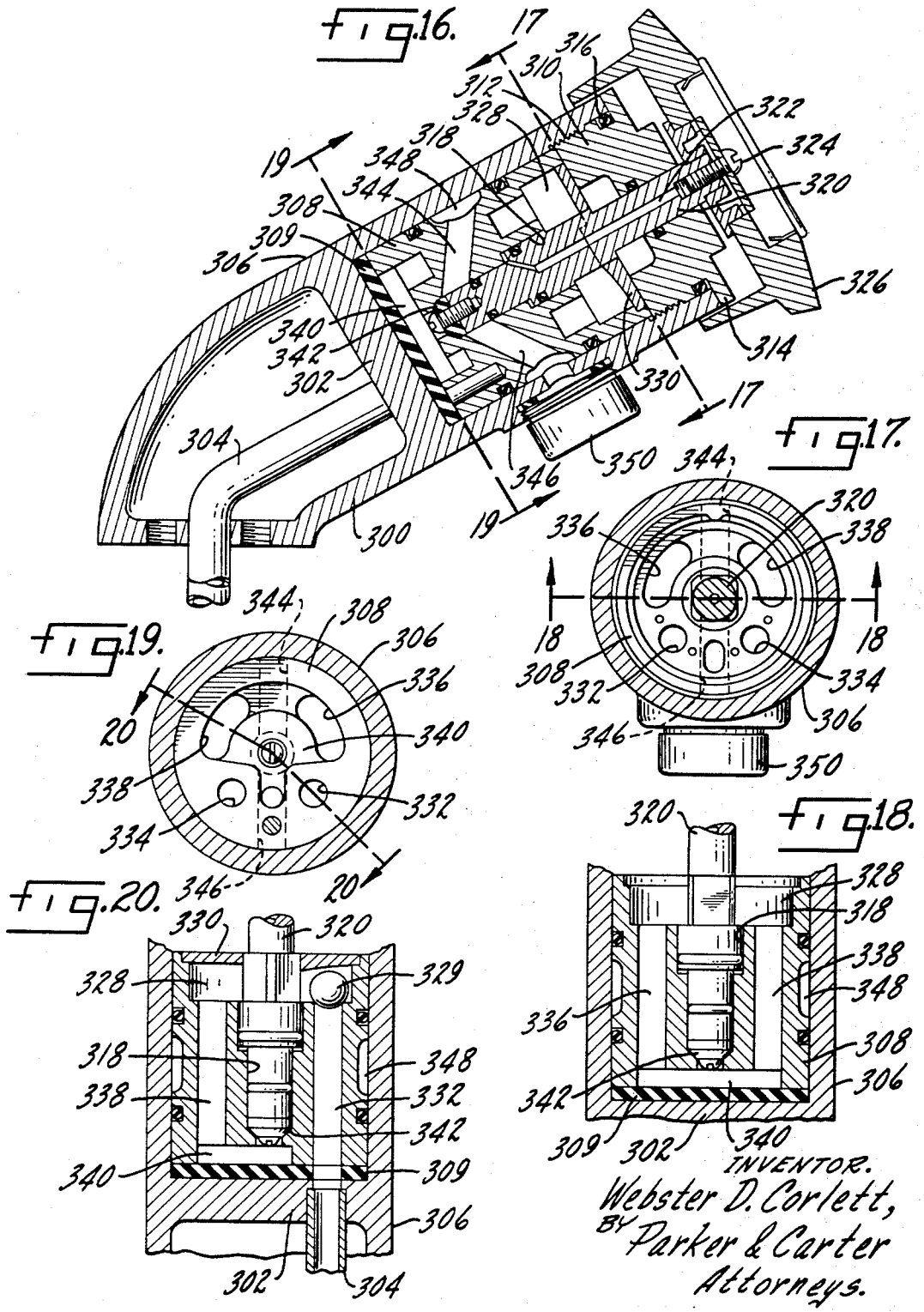

Jan. 7, 1969   W. D. CORLETT   3,420,272
MIXING VALVE

Filed Dec. 5, 1966 fig.21.

INVENTOR.
Webster D. Corlett
BY Parker & Carter
Attorneys.

United States Patent Office 3,420,272
Patented Jan. 7, 1969

3,420,272
MIXING VALVE
Webster D. Corlett, River Forest, Ill., assignor to Standard Screw Company, Bellwood, Ill., a corporation of New Jersey
Continuation-in-part of application Ser. No. 497,151, Oct. 18, 1965. This application Dec. 5, 1966, Ser. No. 599,230
U.S. Cl. 137—636.3          18 Claims
Int. Cl. F16k 11/14

This invention relates to an improved single lever mixing faucet and is a continuation-in-part of my copending application Ser. No. 497,151, filed Oct. 18, 1965, now abandoned.

One purpose of the invention is a single lever mixing faucet which reduces water noise, water turbulence and water hammer.

Another purpose is a single lever mixing faucet in which separate water control members are manipulated by a single lever, with one such member controlling water volume and another member controlling water temperature.

Another purpose is a single lever mixing faucet which eliminates transverse water pressure on the movable valve elements, which transverse pressure can cause excessive wear on the stem and bore if not applied equally from opposite sides of the valve element.

Another purpose is a single lever mixing faucet of the type described which eliminates backflow of water, caused by a decrease in water pressure in either the hot or cold water side of the system.

Another purpose is a reliably operable, compact and simply constructed single handle mixing faucet of the type described.

Another purpose is a single lever faucet of the type described including a built-in control of pressure fluctuation in hot and cold supply lines, eliminating undesirable fluctuations of water temperature in delivery line.

Other purposes will appear in the ensuing specification, drawings and claims.

The invention is illustrated diagrammatically in the following drawings wherein:

FIGURE 1 is a side elevation of the mixing faucet of this invention,

FIGURE 2 is an axial section of the faucet shown in FIGURE 1,

FIGURE 4 is a section along plane 4—4 of FIGURE 2,

Figure 5:
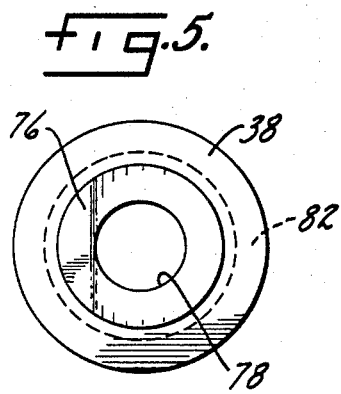
Figure 3:
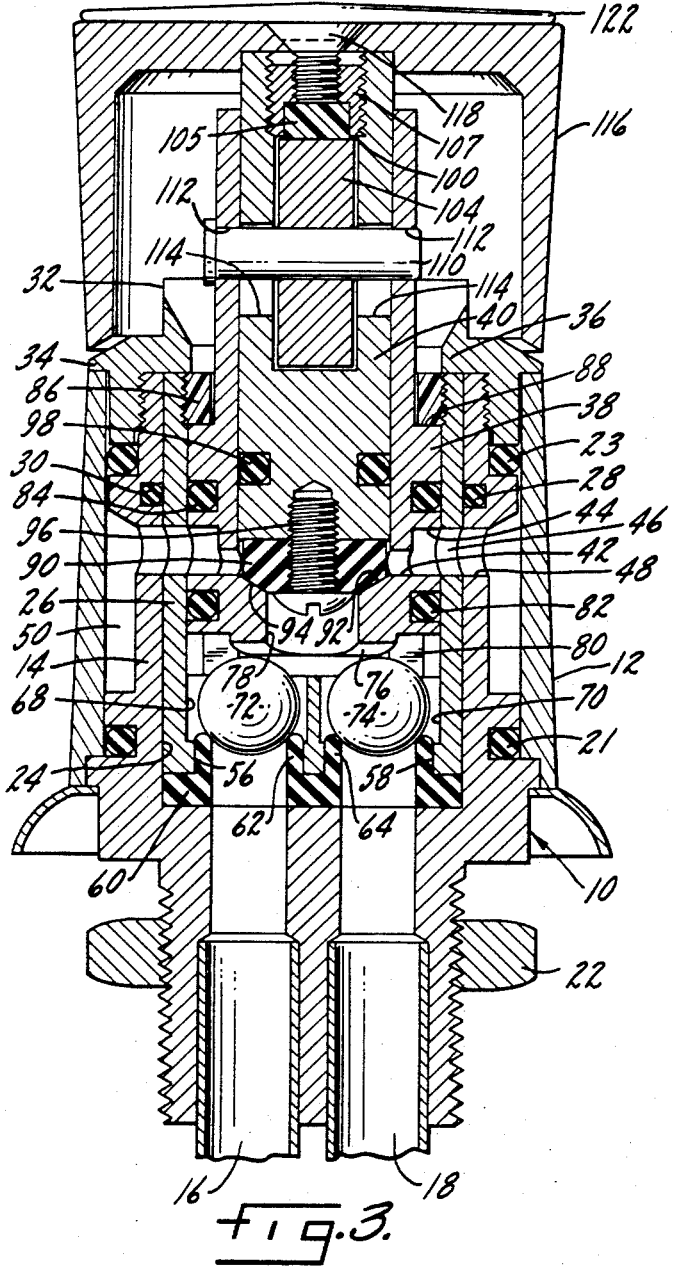
FIGURE 3 is an axial section along plane 3—3 of FIGURE 2.

FIGURE 5 is an end view of the temperature control cam taken along plane 5—5 of FIGURE 2, FIGURE 6 is an axial section of a modified form of mixing faucet, FIGURE 7 is a section along plane 7—7 of FIGURE 6, with parts removed, FIGURE 8 is a top plan view of the structure shown in FIGURE 7, FIGURE 9 is a section along plane 9—9 of FIGURE 8, FIGURE 10 is a bottom elevation of the cam member used in the faucet shown in FIGURES 6–9, FIGURE 11 is a side elevation of the plunger used in the faucet shown in FIGURES 6–9, FIGURE 12 is a side elevation of a modified form of faucet, FIGURE 13 is an axial section, similar to FIGURE 6, of the faucet shown in FIGURE 12, FIGURE 14 is a section along plane 14—14 of FIGURE 13, FIGURE 15 is a bottom elevation of the cam member used in the faucet shown in FIGURES 12–14, FIGURE 16 is an axial section through a further form of the invention, FIGURE 17 is a section along plane 17—17 of FIGURE 16, FIGURE 18 is a section along plane 18—18 of FIGURE 17, FIGURE 19 is a section along plane 19—19 of FIGURE 16, FIGURE 20 is a section along plane 20—20 of FIGURE 19, FIGURE 21 is a vertical section through an additional form of the invention, FIGURE 22 is a section along plane 22—22 of FIGURE 21, FIGURE 23 is a section along plane 23—23 of FIGURE 21, and FIGURE 24 is a top plan view of a portion of the valve shown in FIGURE 22.

The faucet shown in FIGURES 1–5 may include a housing indicated generally at 10 and having an ornamental outer housing member 12 which may, for example, be chrome plated, and an internal housing member 14, the lower end of which may be suitably attached to the hot and cold water inlet pipes 16 and 18. The outer housing 12, which may be rotatable, may mount a spout 20, as is conventional. The lower end of the inner housing member 14, which provides the hot and cold water inlet conduit receiving area, may be suitably attached, by a large nut or the like 22, to the base of a sink. Seal rings 21 and 23 may be positioned between the inner and outer housing members.

The inner housing member 14 is generally cylindrical in form and has an inner chamber 24 within which is positioned a sleeve member or valve member 26. An O-ring or the like 28, positioned in a groove 30, may seal the upper end of the sleeve 26 to the housing member 14 to prevent water seepage beyond this point. A lock member 32 may be threaded onto the outside of housing member 14 and may have flanges 34 and 36 which extend over the ornamental housing 12 and the sleeve 26 for holding these members together.

Concentrically positioned within sleeve 26 is a second sleeve 38, which may be described as a temperature control member. The sleeve 38 is hollow and mounts a plunger 40, which may be described as a volume control member. The sleeve 38 may have a plurality of discharge ports 42 which open into an annular passage 44, which extends around the circumference of the sleeve and is in axial alignment with a plurality of discharge ports 46 formed in the sleeve 26. The ports 46 in like manner are axially aligned with a plurality of discharge ports 48 formed in the inner housing section 14, with the ports 48 opening into a circumferentially extending annulus 50 which is in communication with the spout 20 through a passage or port 52.

The sleeve 38 is positioned within a chamber 54 formed within the sleeve 26 and there are a pair of inlets 56 and 58 at the bottom of sleeve 26 which are in communication with chamber 54. A sealing member 60 is positioned between the bottom of sleeve 26 and the lower section of inner housing member 14. The sealing member 60 is circular in form and may have a pair of projections 62 and 64 which extend upwardly and concentrically into inlets 56 and 58 of sleeve 26. The projections 62 and 64 may be eliminated in some applications. The seal member 60 may also have an axially extending projection 66 which is used in positioning the seal member 60, sleeve 26 and the housing relative to each other. Inlet ports 56 and 58 of the sleeve 26 have inner enlarged portions 68 and 70, respectively, with balls 72 and 74 being positioned within said enlarged portions. Balls 72 and 74 may be seated upon the upper ends of the concentric sealing portions 62 and 64 to close either the hot or cold water inlet passage.

The position of balls 72 and 74 may be controlled by means of a cam surface 76 which is formed on the bottom of inner sleeve 38 and which extends concentrically about a passage 78 formed in the bottom of inner sleeve 38. Spacers 80, on opposite side of cam 76, may maintain the proper spacing between the bottom of chamber 54 and the lower surface of inner sleeve 38. Rotation of inner sleeve 38 relative to outer sleeve 26 changes the position of the cam surface 76 relative to the balls so that in different positions of cam 76 the balls may be moved varying distances upwardly by water pressure. In this way the amount of water passing through the hot or cold water inlets will be regulated. Cam surface 76 never can close both inlets as it is the purpose of plunger 40 to completely close the faucet.

Sleeve 38 may mount O-rings 82 and 84 positioned on opposite sides of the aligned discharge ports for sealing off water seepage from the discharge ports. An adapt ring 86 may be threaded into outer sleeve 26 and may rest upon a shoulder 88 of the inner sleeve 38 to prevent relative axial movement between the two sleeves.

Plunger 40 may have a lower seal 90 with a conical surface 92 which can seal on a conical surface 94 surrounding the passage 78 when the plunger 40 is in the closed position. A screw or the like 96 may be used to hold the seal 90 to the plunger. An annular seal 98 positioned in a groove in the plunger 40 may be used to seal the outer surface of the plunger and the inner surface of the sleeve 38.

The plunger 40 may have a slot 100 which is in alignment with a pair of slots 102 in an upper extension of the inner sleeve 38. A cam member 104 is positioned within slots 100 and 102 and is fixed to an operating lever 106 which is used in controlling valve movement. A pin 110 passes through cam member 104, along axis 108, and through aligned apertures 112 in the upper end of the inner sleeve 38. The upper end of plunger 40 has elongated slots 114 through which pin 110 also passes, with the slots permitting reciprocal or axial movement between the plunger 40 and sleeve 38. A brake member 105, which may be formed of Teflon or the like, may be adjustably held in place by a screw or the like 107. The brake 105 is in continuous contact with the upper surface of cam 104 and is effective to hold the valve in any adjusted position, including the closed position. The brake also slows down normal valve movement making it easier to perform smaller adjustments in the volume of water discharged.

An outer cover member 116 may be attached by means of a screw or the like 118 to the upper end of plunger 40. The sides of the cover 116 extend downwardly and terminate close to the upper end of the outer housing member 12, so that the valve may have a substantially continuous ornamental outer surface. The cover 116 may have a slot 120 through which the lever 106 extends. The structure may be completed by an outer cover plate 122, which may be used to provide markings on the faucet and is attached by means of snap members or the like 124 extending through openings 126 in the upper end of the cover member 116.

When the valve is in the closed position plunger 40 holds seal 90 against seat 94. No water can reach the discharge ports. To regulate the temperature of water discharged from the valve, lever 106 is rotated, thus permitting upward movement of balls 72 and 74 in varying amounts, due to water pressure in the inlet conduits 16 and 18. The degree of upward movement by the balls will be determined by the position of the cam. For example, if more hot water than cold water is desired, the position of the cam will be such that the ball in the hot water inlet will be permitted more upward travel than the ball over the cold water inlet. In this connection it is preferred that the balls 72 and 74 be made of a material which is fairly lightweight. A nonferrous metal is advantageous, as are many plastics. Rubber or rubber substitutes may also be satisfactory.

To regulate the volume of water discharged, lever 106 is reciprocated which moves plunger 40, the volume control member, relative to inner sleeve 38 or the temperature control member. Upward movement of lever 106 will move plunger 40 in an upward direction, the water within the mixing chamber 54 will then pass through passage 78 and out of the aligned discharge ports 42, 44, 46 and 48 and then through the spout 20. The volume of water discharge is controlled by the distance plunger 40 moves away from seat 94. Normally the amount of axial movement permitted by the plunger will be small with seat 94 limiting downward movement and the relative positions of brake 105 and the upper surface of cam 104 limiting upward movement.

Movement of the plunger 40, or the volume control member, provides complete regulation of the water volume, and this member moves relative to both of the sleeves. In other words, the volume control member has independent movement for performing its function. Water temperature is controlled by rotation of both the volume control member and the temperature control member and these two members together rotate when handle 106 is turned. Volume is controlled by relative movement between plunger 40 and sleeve 38 with temperature being controlled by relative movement between sleeve 38 and sleeve 26. A substantial amount of longitudinal sliding metal-to-metal contact has been eliminated by having separate members perform the two functions of the valve.

Water hammer is reduced by brake 105 which eliminates rapid closing of the valve.

The balls 72 and 74, in addition to providing their normal function of controlling the amounts of hot and cold water that flow into the mixing chamber 54, are also effective to prevent any cross flow of water from the hot water side to the cold water side or vice versa. If there is a substantial reduction in pressure at either one side of the line or the other, the high pressure from the one side of the line will force the low pressure ball back down onto its seat, thus preventing any cross flow of water.

FIGURES 6, 7, 8, 9, 10 and 11 show a modified form of the invention utilizing the same basic principles discussed above. A valve member indicated generally at 130 may be somewhat cylindrical in form and may mount an ornamental housing member 132 about the outer surface thereof by means of an adapter cap 134 which is threaded to the upper end of the valve member 130, as at 136. The outer surface of the adapter cap 134 may also be ornamental and may appear to be a general continuation of the ornamental housing 132. The exterior of the faucet is completed by a rotatable top cap 138, the outer surface of which also may be ornamental in character. There may be a discharge port 140 in the housing member 132 and a spout 142 may be connected to the housing member 132 in alignment with port 140.

The valve member 130 may include a pair of spaced, generally axially extending hot and cold water inlet passages 144 and 146. Although these passages are described as generally axially extending, as illustrated in FIGURE 6, they may diverge slightly from parallelism with the axis of the valve member 130. In effect, they are generally axially extending, and they may be precisely axially extending. The inlet passages 144 and 146 terminate in hot and cold water inlet ports 148 and 150, respectively, which open into a mixing chamber 152. There may be a pair of generally axially extending discharge passages 154 and 156 in the valve member, and as shown in the form of FIGURES 6–11, the axially extending passages 144, 146, 154 and 156, are generally equally spaced about the axis of the valve member. Note particularly FIGURE 8. Passages 154 and 156 are connected together by a generally radially extending passage 158. Passages 154 and 156 connect into the mixing chamber 152 and are placed in communication with the inlet passages 144 and 146 in accordance with the position of a pair of ball members 160 and 162. A cam surface 164 is positioned above the balls 160 and 162 in somewhat the same manner as was described in the form of the invention illustrated in FIGURES 1–5. The position of the cam surface 164 which is the bottom surface of cam member or temperature control member 166, will determine the extent to which the balls 160 and 162 may be moved from ports 148 and 150. There may be a plurality of pin members or integral projections 168 positioned about the balls 160 and 162 so as to hold them generally in axial alignment with the passages 144 and 146.

A closing member 170 may have an outwardly extending shoulder 172 which rests upon the upper surface 174 of the valve member 130. The upper end of the member 170 may have a slot 176 which is used to mount an operating lever or handle 178. Note that the handle 178 extends outwardly through a slot 180 in the top cap 138.

There may be a generally central bore 182 in the valve member 130 which has cylindrical areas with different diameters. A plunger or volume control member 184 may be reciprocal within the bore 182. The upper end of the plunger 184 is connected to the top cap by means of a screw 186. Thus the plunger or volume control member will rotate with the temperature control member. The lower end of the plunger 184 may have a sealing member 188 connected thereto by a screw or the like 190. The sealing member 188 may have a lower conical surface 192 which is adapted to mate with and form a sealing connection with a conical surface 194 or seat formed at the lower end of the bore 182. When the plunger is in the down position of FIGURE 6, water from passage 158 cannot enter the bore and the valve is closed. However, when lever 178 is operated to reciprocate the plunger in an upward direction, water from passages 154, 156 and 158 will enter the bore and will be placed in communication with a plurality of generally radially extending discharge passages 196 which extend outwardly through the valve member 130 and connect to an annular recess 198 formed on the exterior of the valve mmeber. Note particularly FIGURE 6 which shows the annular recess 198 in alignment with the port 140 which connects to the spout 142. Thus reciprocation of the plunger 184 is effective to control the volume of water flowing from the temperature control member to the discharge of the faucet. Although the passages 196 have been described as generally radially extending, it should be obvious from FIGURE 9 that they have both a radial and axial component. However, what is important is that they extend from the bore 182 outwardly toward the annular recess 198 so as to communicate with the faucet spout.

The plunger 184 may have a vent passage 200 which opens to the atmosphere at its upper end and is in communication with the bore at its lower end. In this way, there will be no air entrapped in the annular space 202 formed by shoulders on both the bore and the plunger. The plunger 184 may mount a plurality of seal rings or the like 204 and 206 which are positioned to seal the mating surfaces of the plunger and bore. In like manner, there may be a seal ring 208 formed in the temperature control member 170 to seal the mating surfaces of the temperature control member and plunger. There may be seal rings 210 and 212 positioned in grooves in the valve member 130 to seal the mating surfaces of the valve member and the outer housing member 132. There may also be a seal ring 214 positioned to seal the mating surfaces between the temperature control member and valve member 130.

FIGURE 11 illustrates the plunger or volume control member in detail. The upper end 216 of the plunger may have flatted areas for connection with top cap 138. An intermediate area 218 may be generally square in cross section so that rotation of the plunger will turn the temperature control member. Note particularly FIGURE 10 in which the opening 220 formed in the temperature control member for the plunger is generally square in cross section. There is clearance however, between opening 220 and the plunger so that the plunger may reciprocate independently of the temperature control member. Also, this clearance permits water to reach shoulder 229 on the plunger for pressure stabilization as described hereinafter.

The faucet shown in FIGURES 6–11 may be completed by an arcuate slot 222 formed in the temperature control member or cam, which slot cooperates with a projection 224 formed on the inner surface of the valve member 130. The projection 224 and the arcuate slot 222 are effective to limit rotational movement of the temperature control member to those positions which are necessary for controlling the temperature of water flowing through the hot and cold water inlets.

In operation, rotation of lever 178 is effective to turn top cap 138, plunger 184 and the temperature control member 170 having cam surface 164. The position of cam surface 164 relative to balls 160 and 162 will control the amounts of water flowing out of the hot and cold water inlet ports 148 and 150. Either port may be completely closed or both ports may be opened in varying amounts. Thus, the temperature of the water flowing into the mixing chamber 152 will be controlled by rotation of lever 178. Up and down movement of lever 178 is effective to reciprocate plunger 184 and thus control the volume of water flowing by valve seat 192 into bore 182. The water within bore 182 flows radially outwardly through passages 196 and thus to the spout 142. The reciprocal movement of plunger 184 is limited, in an upward direction, by a shoulder 226 formed on the interior surface of the temperature control member, with downward movement of the plunger being limited by shoulder 228 formed in the bore 182.

The valve of FIGURES 6–11 is pressure stabilized in both the open and closed positions. In the closed position, a closing force is exerted on the plunger by water pressure acting downwardly on shoulder 229. There is an upward or opening force due to water pressure acting upwardly on the exposed area of seal 188. However, the exposed area of the seal is smaller than the cross section of shoulder 229, hence the valve is over-stabilized in the closing direction. In the open position of the valve the area of shoulder 229 is equal to the cross sectional exposed area of seal 188 and the valve is thus stabilized at any open position.

FIGURES 12, 13, 14 and 15 show a substantially similar faucet, but in this case adapted for use in a bathroom basin. The faucet disclosed in FIGURES 6–11 is more readily adapted for use in the kitchen.

Turning particularly to FIGURE 13, the valve member 230 may have an outer ornamental surface and thus the valve member may form the housing outer surface itself. A discharge spout 232 may fasten onto the outer surface of the valve member 230 as is conventional. The valve member 230 may have a plurality of generally axially extending inlet passages 234 and 236, one for hot water and one for cold water. There may be a pair of generally axially extending discharge passages 238 and 240, somewhat the same as shown in FIGURES 6–11. The passages 238 and 240 may be connected by a cross passage 242 which is in communication with a bore 244 mounting a reciprocal plunger 246. There may be a single generally radially extending discharge passage 248 which connects the spout 232 and the bore 244. The plunger 246 may be generally the same as described in connection with that form of the invention shown in FIGURES 6–11.

An adapter or lock nut 250 overlies the upper end of the valve member 230 and is screw-threaded onto the valve member. The lock nut 250 holds the cam member or temperature control member 252 in position relative to the temperature control balls, one of which is illustrated at 254. Again, there are pins or the like 256 to properly align the ball members with their respective inlet passages. A seal ring 258 may be formed in a groove at the upper end of the valve member 230 for sealing mating surfaces of the valve member and the lock nut 250. The cam member or temperature control member 252, illustrated particularly in FIGURE 15, may have an arcuate groove 260 which cooperates with an axially extending pin 262 for limiting the rotational movement of the faucet handle or control member.

At the upper end of the plunger 246 there is a top cap 264, which is attached to the plunger by means of a screw or the like 266. A removable cover 268 encloses the screw 266 and forms the outer ornamental surface of the handle 264. A seal ring 270 may seal mating surfaces of the plunger and lock nut 250.

The operation of the faucet illustrated in FIGURES 12–15 is substantially the same as that shown in FIGURES 6–11. In this case the discharge passages and inlet passages 234, 236, 238 and 240 are not generally equally spaced about the axis of the faucet, but are grouped, this grouping being necessitated by the single radially extending discharge passage 248 communicating with the spout 232. In other respects the faucets are generally the same. There is no outer housing, as in this case the valve member itself has an outer ornamental surface to form the exterior of the faucet. Rotation of the handle 264 is effective to rotate cam member 252 or the temperature control member and thus control the distance at which the balls, one of which is illustrated at 254, may move away from the hot and cold water inlet ports, to thus control the temperature of the water entering into the mixing chamber 272. Reciprocation of handle 264 is effective to reciprocate the plunger 246 and thus control the volume of water flowing from discharge passages 238, 240 and 242 into spout 232.

The plunger 246 is stabilized in the same manner as the plunger 184 of FIGURES 6–11. In the closed position the force exerted by water pressure on shoulder 274 will overcome the opening force exerted on the exposed area of seal 276 to hold the plunger in a closed position. In any open position of the plunger, the water pressure supplied force on shoulder 274 will be equal and opposite to the force on the exposed area of seal 276 inasmuch as the exposed area of the seal and the area of the shoulder are equal.

FIGURES 16–20 show still a further form of the invention. As illustrated particularly in FIGURE 16, there may be a faucet housing 300 having a valve mounting plate 302 through which hot and cold water inlet pipes extend, one of said pipes being indicated at 304. The housing 300 may have a generally cylindrical valve enclosing portion 306 which mounts a valve body 308 generally the same as the valve member 230 illustrated in FIGURE 13. A seal 309 may be positioned between the bottom of the valve body 308 and mounting plate 302. A closure cap 310 may be threadedly mounted, as at 312, to the housing portion 306 and may have a shoulder 314 overlying the upper end of the housing portion 306. An O-ring 316 may seal this connection.

The valve body 308 may have a generally central bore 318, substantially the same as the central bores described earlier. A plunger 320 may be reciprocally mounted in the bore and the plunger 320 may have a vent passage 322. The upper end of the plunger 320 may be attached, by means of a screw or the like 324, to a top cap 326, with the outer circumferential or peripheral edge of the top cap extending down beyond the upper end of the housing portion 306.

There may be a mixing chamber 328 within the valve member 308, and there may be balls 329, one of which is shown in FIGURE 20, positioned in the mixing chamber to control the flow of hot and cold water into the chamber. A cam 330, or temperature control member substantially the same as described before, and arranged to rotate with the plunger 320, may be positioned to control the position of the ball valves within the chamber 328.

As shown particularly in FIGURE 17, the valve body 308 may have hot and cold water inlet passages 332 and 334 which lead into chamber 328, with the opening into the chamber being controlled by the position of the ball valves.

Extending downwardly from chamber 328 are water discharge passages 336 and 338 which terminate in a generally radially extending passage area 340 at the bottom of the valve member adjacent seal 309. The passage area 340 is in communication with the bore 318 when the plunger is in the up position. As was described before, the bottom of the plunger may have a seal member 342 which effectively closes the valve. Water discharge passages 344 and 346 may extend radially, and slightly upwardly away from the bore 318 toward an annular recess or groove 348 which is in communication with a spout 350. When the plunger is in the up position, passages 344 and 346 are in communication with the passage area 340 and hence the water, the temperature of which is controlled by the position of the ball valves, will flow outwardly to the groove 348 and then to the spout 350.

The valve shown in FIGURES 16–20 operates substantially the same as the valves shown in the earlier forms of the invention. When the plunger is reciprocated, the volume of the water will be controlled. The cam member 330 will not reciprocate with the plunger, as the cam member or temperature control member can only rotate. The plunger 320 may be stabilized in both the open and closed positions in the same manner, as described in connection with the other forms of the invention.

FIGURES 21–24 show a modified form of the invention in which there is a lower housing section 400 having hot and cold water inlet ports 402 and 404. Threadedly mounted to the housing section 400 is a sleeve 406 having an outwardly extending upper shoulder which overlies an outer ornamental housing member 408.

Within the housing section 400 is a chamber 410 mounting a valve housing 412. Within the housing 412 is a chamber 414 which is connected to the hot and cold water inlets by passages 416 and 418. A valve member or spool 420 is within the chamber 414 and has enlarged conical end portions 422 at its opposite ends. There are outlets 424 and 426 from the chamber 414. In effect, the valve member 420 functions as a temperature regulator. For example, if the pressure on the cold water side from passage 418 should be reduced, the pressure from the hot side, acting against the left-hand end of the valve 420 would tend to move the valve 420 toward the right. This would reduce the size of the opening through which hot water flows into chamber 414 while increasing the size of the opening through which cold water flows into the chamber.

Positioned directly above the temperature regulator is a valve member 428, similar to the valve members described previously. There are hot and cold water passages 430 and 432 in the valve member which are in communication with the discharge openings 424 and 426 in the temperature regulator. The passages 430 and 432 extend generally axially up to a mixing chamber 434. There may be a pair of balls 436, as described previously, within the mixing chamber 434 which are effective to control the amount of hot and cold water entering chamber 434 from passages 430 and 432.

A temperature control member 438, having a lower cam within the valve member 428. The lower end of the bore 444 may have a seat 446 which cooperates with a generally conical seal member 448 on the lower end of the plunger. When the plunger is moved upwardly seal 448 will move away from seat 446 so that the space 450, at the bottom of the valve member, is in communication with the bore 444.

There may be downwardly extending passages 450 and 452 within the valve member 428 which connect with the mixing chamber 434 and with the lower water space 450. As described before, there may be radially outwardly extending discharge passages 454 which connect with the bore 444 and with an annular recess 456 in the outer circumference of the valve member 428. The sleeve 406 has ports 458 circumferentially spaced about its circumference in alignment with the recess 456 so that water from passages 454 may flow outwardly to an annular recess or groove 460 in the internal side of the ornamental housing member 408. A conventional spout 462 is attached on the outside of the housing member 408 and is connected to the annular groove 460 through a discharge port 464.

The stem 442 may have a vent passage 466. The stem may also have a number of seal rings about its outer circumference. In like manner there may be a number of seal rings positioned to seal opposing surfaces of the sleeve 406, outer housing 408 and the external surface of the valve member 428. It is not thought necessary to describe each of these seal rings in detail, as comparable seals have been described previously.

The upper end of the stem 442 is attached by means of a screw or the like 468 to an operating handle 470. The outside handle 470 stops just short of the upper conical surface of the sleeve 406. The stem or plunger 442 functions as a volume control member in that reciprocation of the stem is effective to control the position of the seal 448 relative to the seat 446. The temperature control member 438 will be rotated by the handle and will rotate with the stem. The temperature control member will not, however, move reciprocally with the stem. The stem 442 is generally circular in cross section except for an area 472 adjacent the temperature control member 438. The cross section of the area 472 is square as is the opening in the temperature control member. In this way, the stem, or volume control member, and the temperature control member rotate together.

Rotation of handle 470 controls the position of cam 440 which in turn regulates the position of the balls 436 to control the amounts of hot and cold water entering the mixing chamber 434. Water from the mixing chamber flows downwardly through passages 450 and 452 to the area 450 beneath the seal 448. Reciprocation of the plunger controls the position of the seal relative to its mating seat and so regulates the volume of water flowing outwardly through discharge passages 454.

It is necessary to regulate the temperature of the water flowing into the mixing valve so that a variation in line pressure will not close off one of the inlet passages 430 or 432. For example, without the temperature regulator described above, in the event of a drop in cold water pressure, the hot water entering chamber 434 would be effective to push one of the balls 436 into a closing position on the discharge end of passage 432. Thus, the faucet would only provide hot water due to a drop in cold water pressure. The same would be true if hot water pressure dropped. The temperature regulator is effective to equalize the pressures of the hot and cold water flowing into the mixing chamber 434 so that line pressure does not influence the amounts of hot and cold water flowing into the valve.

Although the valves shown and described herein are arranged for operation in either a basin, for example a bathroom basin, or a kitchen sink, it should be obvious that the same valve may be easily adapted for shower operation, tub operation, or for a combination tub and shower.

The plunger or stem 442 may be stabilized in both its open and closed positions as was described in connection with the other forms of the invention.

Although no diverters are shown in connection with any of the faucets disclosed herein, it should be obvious that diverters may be easily adapted for use with such faucets, if desired.

It is important to eliminate as much axial movement in the device as possible. All contacting surfaces must be provided with O-ring seals or other satisfactory equivalent seals to prevent water leakage from the faucet. When these seals are between surfaces that axially move relative to each other during operation of the valve, the seals perform a dynamic sealing function and it is desirable to eliminate as many such sealing areas as possible. When dynamic seals are moved in a direction which is the same as the water pressure applied to the seals, the valve may stick and not move as freely as desired.

It is desirable to have the water flow substantially axially through the valve, rather than having the hot and cold water inlets at opposing portions of the valve such that the water pressure from the inlets may meet in the center of the valve. Such a meeting of water from two different directions under pressure can cause water turbulence and noise, and can apply radially directed or transverse pressure to the valve member. Such radially directed pressure, when unequal, and after continuous use, may eventually cause wear resulting in leakage of the valve and faucet.

Whereas the preferred form of the invention has been shown and described herein, it should be realized that there are many modifications, substitutions and alterations thereto within the scope of the following claims.

What is claimed is:

1. For use in a single handle mixing faucet having hot and cold water inlets and a water discharge, a valve for controlling the volume and temperature of the water supplied to the discharge, including a valve member having hot and cold water inlets and at least one discharge port, a rotatable temperature control member associated with the valve member and having means thereon for use in regulating the amount of water passing from said valve member hot and cold water inlets toward said discharge, a reciprocal volume control member within said valve member and having means thereon for controlling the volume of water passing from said temperature control member to said discharge, and a single handle operatively connected to and for manipulating said temperature control member and said volume control member.

2. The structure of claim 1 further characterized in that said volume control member is concentric with and positioned within said temperature control member, with said volume control member rotating with said temperature control member, but reciprocating relative to it.

3. The structure of claim 1 further characterized in that said volume control member rotates with said temperature control member, but reciprocates relative to said temperature control member.

4. The structure of claim 1 further characterized by and including cam means on said temperature control member for selectively controlling the amounts of water passing from said valve member hot and cold water inlets, said handle being operatively connected to said temperature control member, such that rotation of said handle is effective to control the movement of said cam means.

5. The structure of claim 4 further characterized in that said cam means includes a rotatable cam surface.

6. The structure of claim 5 further characterized in that said cam means further includes a pair of ball members positioned to cooperate with said rotatable cam surface.

7. The structure of claim 1 further characterized in that said valve member includes a pair of spaced generally axially extending hot and cold water inlet passages.

8. The structure of claim 7 further characterized in that said valve member includes a mixing chamber, said inlet passages opening into said chamber, and at least one generally axially extending discharge passage connecting to said chamber.

9. The structure of claim 8 further characterized by a generally axially extending bore in said valve member, said volume control member being reciprocal in said bore, a valve seat formed in said bore, and means on said volume control member for forming a seal with said valve seat, passage means connecting said generally axially extending discharge passage to said bore at one side of said valve seat, and passage means connecting said valve member discharge port to said bore at the opposite side of said valve seat.

10. The structure of claim 8 further characterized by a pair of generally axially extending discharge passages, all of said generally axially extending passages being somewhat arcuately arranged about the axis of said valve member.

11. The structure of claim 10 further characterized by a generally axially extending bore in said valve member, said bore being radially inside of said generally axially extending passages, said volume control member being reciprocal in said bore.

12. The structure of claim 11 further characterized in that all of said generally axially extending passages are generally equally spaced, and a plurality of generally radially extending discharge passages in communication with said bore, there being one such radially extending passage between adjacent generally axially extending passages.

13. A single handle mixing fauset including a valve member having hot and cold water inlets and a water discharge, passage means connecting said inlets and discharge, means for controlling the volume and temperature of water moving through said passage means including a volume control member and a temperature control member, an operating member connected to both said volume control member and temperature control member for manipulation thereof, said volume control member being reciprocal in said valve member independently of said temperature control member, with said volume control member and temperature control members being rotatable together in response to rotation of said operating member.

14. The structure of claim 13 further characterized in that said volume control member and temperature control member are concentric about the same axis, with said volume control member being within said temperature control member.

15. The structure of claim 14 further characterized in that said passage means conveys water from said inlets to said temperature control member, and from said temperature control member to said volume control member.

16. The structure of claim 13 further characterized in that said temperature control member includes a rotatable cam surface, and a reciprocal plunger for said volume control member.

17. The structure of claim 13 further characterized by and including movable valve means associated with said valve member inlets for regulating the amounts of hot and cold water supplied to said inlets in accordance with the pressure in the hot and cold water supply lines.

18. The structure of claim 17 further characterized in that said movable valve means includes a chamber having inlets at its opposite ends and a movable spool within said chamber, and outlets from said chamber intermediate its ends.

References Cited

UNITED STATES PATENTS

| | | | |
|---|---|---|---|
| 1,573,210 | 2/1926 | Whidden | 137—636.2 |
| 2,614,851 | 10/1952 | Parker | 137—607 XR |
| 2,983,279 | 5/1961 | Bierman | 137—637.4 XR |
| 3,190,306 | 6/1965 | Staat et al. | 137—636.2 |
| 3,286,720 | 11/1966 | Mongerson | 137—636.4 XR |
| 3,351,095 | 11/1967 | Harvey et al. | 137—636.4 XR |
| 3,372,710 | 3/1968 | Miller | 137—607 XR |

STANLEY N. GILREATH, *Primary Examiner.*

W. H. SCHROEDER, *Assistant Examiner.*

U.S. Cl. X.R.

137—607, 636.4